(12) United States Patent
Yoshimi et al.

(10) Patent No.: US 11,283,584 B2
(45) Date of Patent: *Mar. 22, 2022

(54) HIGH FREQUENCY MODULE

(71) Applicant: Murata Manufacturing Co., Ltd., Kyoto (JP)

(72) Inventors: Syunji Yoshimi, Kyoto (JP); Takeshi Kogure, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 142 days.

This patent is subject to a terminal disclaimer.

(21) Appl. No.: 16/433,286

(22) Filed: Jun. 6, 2019

(65) Prior Publication Data

US 2019/0288826 A1    Sep. 19, 2019

Related U.S. Application Data

(63) Continuation of application No. 15/848,423, filed on Dec. 20, 2017, now Pat. No. 10,355,850.

(30) Foreign Application Priority Data

Dec. 21, 2016    (JP) .............................. JP2016-247989

(51) Int. Cl.
| | | |
|---|---|---|
| *H04L 5/14* | (2006.01) | |
| *H04B 1/44* | (2006.01) | |
| *H01Q 1/24* | (2006.01) | |
| *H04B 1/00* | (2006.01) | |

(52) U.S. Cl.
CPC ........... *H04L 5/1461* (2013.01); *H01Q 1/247* (2013.01); *H04B 1/0057* (2013.01); *H04B 1/44* (2013.01)

(58) Field of Classification Search
None
See application file for complete search history.

(56) References Cited

U.S. PATENT DOCUMENTS

| | | | |
|---|---|---|---|
| 6,466,103 B2 | 10/2002 | Iwamoto | |
| 6,480,708 B1 | 11/2002 | Tanaka | |
| 6,803,817 B2 | 10/2004 | Winslow | |
| 6,987,950 B2 | 1/2006 | Coan | |
| 6,990,357 B2* | 1/2006 | Ella | H04B 1/18 455/553.1 |
| 7,053,731 B2 | 5/2006 | Iwamoto | |
| 7,155,252 B2* | 12/2006 | Martin | H04B 1/005 455/553.1 |
| 7,174,165 B2 | 2/2007 | Lee | |
| 7,212,789 B2 | 5/2007 | Kuffner | |
| 7,269,441 B2* | 9/2007 | Ella | H04B 1/0057 455/552.1 |

(Continued)

FOREIGN PATENT DOCUMENTS

| | | |
|---|---|---|
| CN | 1881810 A | 12/2006 |
| CN | 105187083 A | 12/2015 |
| WO | 2016/117196 A1 | 7/2016 |

*Primary Examiner* — Gregory B Sefcheck
(74) *Attorney, Agent, or Firm* — Pearne & Gordon LLP

(57) ABSTRACT

A high frequency module includes a duplexer that includes a transmission filter, a receive-only filter, and a power amplifier that power-amplifies a transmission signal. In order to improve the isolation characteristics between a transmission signal and a reception signal at the duplexer, the receive-only filter is arranged between the power amplifier and the duplexer.

4 Claims, 7 Drawing Sheets

(56) References Cited

U.S. PATENT DOCUMENTS

| | | | |
|---|---|---|---|
| 7,379,751 B2 * | 5/2008 | Wada | H04B 1/005 330/126 |
| 7,486,114 B2 * | 2/2009 | Chen | H04L 25/0274 327/20 |
| 7,868,715 B2 | 1/2011 | Ito | |
| 8,013,673 B2 | 9/2011 | Makioka | |
| 8,174,339 B2 | 5/2012 | Matsuda | |
| 8,222,969 B2 | 7/2012 | Nagai | |
| 8,274,342 B2 | 9/2012 | Tsutsumi | |
| 8,320,842 B2 * | 11/2012 | Rousu | H04B 1/0057 455/78 |
| 8,422,412 B2 | 4/2013 | Hahn | |
| 8,436,778 B2 * | 5/2013 | Fujiwara | H03H 9/725 343/722 |
| 8,618,992 B2 * | 12/2013 | Fujiwara | H03H 9/46 343/722 |
| 8,767,859 B2 | 7/2014 | Fukamachi | |
| 8,830,910 B2 | 9/2014 | Skarp | |
| 8,892,057 B2 | 11/2014 | Khlat | |
| 8,977,216 B2 * | 3/2015 | Weissman | H04B 1/18 455/77 |
| 8,977,226 B2 * | 3/2015 | Kim | H01Q 1/52 455/317 |
| 9,035,721 B2 | 5/2015 | Takenoshita | |
| 9,154,171 B2 * | 10/2015 | Rousu | H04B 1/16 |
| 9,214,920 B2 | 12/2015 | Link | |
| 9,219,467 B2 | 12/2015 | Inoue | |
| 9,250,452 B1 * | 2/2016 | Yap | G02B 6/4279 |
| 9,312,888 B2 | 4/2016 | Weissman | |
| 9,319,026 B2 * | 4/2016 | Uejima | H03H 9/72 |
| 9,385,686 B2 | 7/2016 | Nishizawa | |
| 9,391,762 B2 * | 7/2016 | Rousu | H04L 5/0028 |
| 9,397,721 B2 | 7/2016 | Pehlke | |
| 9,559,661 B2 | 1/2017 | Inoue | |
| 9,564,932 B1 * | 2/2017 | Pack | H04B 1/1036 |
| 9,711,834 B2 | 7/2017 | Wada | |
| 9,748,992 B2 | 8/2017 | Pehlke | |
| 9,768,837 B2 * | 9/2017 | Charvat | G01S 13/878 |
| 9,768,941 B2 | 9/2017 | Pehlke | |
| 9,917,628 B2 * | 3/2018 | Liang | H04B 7/15507 |
| 10,116,348 B2 * | 10/2018 | Obiya | H04B 1/006 |
| 10,447,337 B2 * | 10/2019 | Wyville | H04B 1/525 |
| 2006/0276158 A1 | 12/2006 | Okabe | |
| 2011/0057730 A1 | 3/2011 | Makioka | |
| 2011/0193650 A1 | 8/2011 | Takenoshita | |
| 2015/0009873 A1 | 1/2015 | Liu et al. | |
| 2017/0222687 A1 | 8/2017 | Wyville | |
| 2017/0317002 A1 | 11/2017 | Kitahara et al. | |

* cited by examiner

HIGH FREQUENCY MODULE

This is a continuation of U.S. patent application Ser. No. 15/848,423 filed on Dec. 20, 2017 and issued as U.S. Pat. No. 10,355,850 on Jul. 16, 2019, which claims priority from Japanese Patent Application No. 2016-247989 filed on Dec. 21, 2016. The contents of these applications are incorporated herein by reference in its entirety.

BACKGROUND OF THE DISCLOSURE

Field of the Disclosure

The present disclosure relates to a high frequency module.

Description of the Related Art

Mobile communication terminals such as cellular phones have been demanded that one terminal should support multiple communication methods (multiple modes) and multiple frequency bands (multiple bands). Communication methods include, for example, Global System for Mobile Communications (GSM™), Enhanced Data Rates for GSM Evolution (EDGE), Universal Mobile Telecommunications System (UMTS), Wideband Code Division Multiple Access (W-CDMA), Long Term Evolution (LTE), and the like. For each of the communication methods, a frequency band is defined based on communication standards. Furthermore, based on the background of high-density mounting of components mounted on a mobile communication terminal, surface mounting of various components such as an antenna switch, a band selection switch, a duplexer, a power amplifier, a low-noise amplifier, and a matching circuit on the same wiring board has progressed.

However, in such high-density mounting, some signal components of transmission signals outputted from the power amplifier may be caused to flow, by electromagnetic coupling, into a reception filter of the duplexer or a reception path and inputted to the low-noise amplifier. In order to ensure isolation characteristics between a transmission signal and a reception signal, it is effective to provide some distance between components so as not to cause the above-mentioned electromagnetic coupling. However, it is difficult for mobile communication terminals, for which miniaturization is required, to ensure sufficient isolation characteristics between a transmission signal and a reception signal by providing some distance between components in a small mounting area.

BRIEF SUMMARY OF THE DISCLOSURE

Accordingly, it is an object of the present disclosure to suggest a high frequency module capable of solving the above problem and improving the isolation characteristics between a transmission signal and a reception signal.

According to preferred embodiments of the present disclosure, a high frequency module includes (i) a duplexer that includes a transmission filter, a frequency band of a transmission signal being defined as a pass band of the transmission filter and a frequency band of a first reception signal being defined as a stop band of the transmission filter, and a reception filter, the frequency band of the transmission signal being defined as a stop band of the reception filter and the frequency band of the first reception signal being defined as a pass band of the reception filter; (ii) a receive-only filter, a frequency band of a second reception signal having a frequency band different from the frequency band of the first reception signal being defined as a pass band of the receive-only filter; and (iii) a power amplifier that power-amplifies the transmission signal. The receive-only filter is arranged between the power amplifier and the duplexer.

With a high frequency module according to an embodiment of the present disclosure, isolation characteristics between a transmission signal and a reception signal may be improved.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Embodiments of the present disclosure will be described below with reference to the drawings. The same signs represent the same circuit components, and redundant explanation will be omitted.

Figure 1:
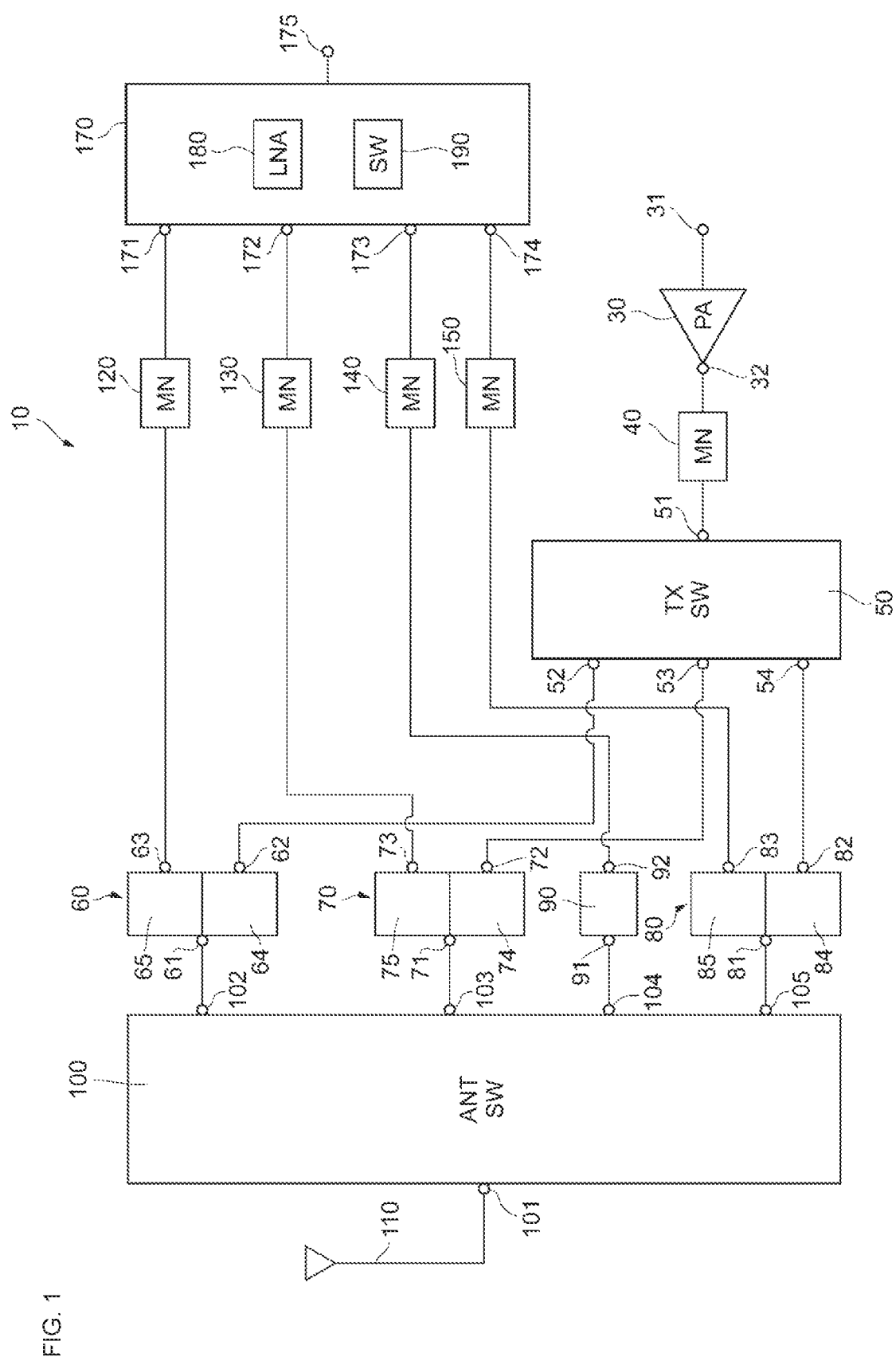
FIG. 1 is an explanatory diagram illustrating a circuit configuration of a high frequency module according to a first embodiment of the present disclosure.

FIG. 1 is an explanatory diagram illustrating the circuit configuration of a high frequency module 10 according to a first embodiment of the present disclosure. The high frequency module 10 is a module, in a mobile communication terminal such as a cellular phone, which performs processing for transmitting and receiving radio frequency (RF) signals of multiple frequency bands to and from a base station, and may be referred to as a transmission and reception module.

The high frequency module 10 supports multiple modes and multiple bands, and is configured, for example, to transmit three types of transmission signals of different frequency bands and receive four types of reception signals of different frequency bands. For distinction among the three types of transmission signals, they will be referred to as a transmission signal A, a transmission signal B, and a transmission signal C. In the case where there is no need to distinguish among the three types of transmission signals, they will be simply referred to as transmission signals. Similarly, for distinction among the four types of reception signals, they will be referred to as a reception signal A, a reception signal B, a reception signal C, and a reception signal D. In the case where there is no need to distinguish among the four types of reception signals, they will be simply referred to as reception signals. The high frequency module 10 is capable of transmitting and receiving the transmissions signal A and the reception signal A at the same time. Similarly, the high frequency module 10 is capable of transmitting and receiving the transmission signal B and the receptions signal B at the same time, and is also capable of transmitting and receiving the transmission signal C and the reception signal C at the same time. Frequency bands in which transmission signals and reception signals may be transmitted and received at the same time include, for example, band 8, band 12, band 13, band 14, band 20, band 26, band 28, and so on. The reception signal D uses a frequency band (for example, band 29) dedicated to reception. The number of types of transmission signals is not limited to three. The number of types of transmission signals may be one, two, four, or more. The number of types of reception signals is not limited to four. The number of types of reception signals may be two, three, five, or more.

The high frequency module 10 mainly includes a power amplifier 30, duplexers 60, 70, and 80, a receive-only filter 90, a low-noise amplifier module 170, an antenna switch 100, a transmission signal selection switch 50, and matching circuits 40, 120, 130, 140, and 150.

The power amplifier 30 includes an input terminal 31 and an output terminal 32. The power amplifier 30 amplifies the power of the transmission signals A, B, and C inputted to the input terminal 31 from a radio frequency integrated circuit (RFIC), and outputs the resultant transmission signals A, B, and C via the output terminal 32. The transmission signal selection switch 50 includes an input terminal 51 and output terminals 52, 53, and 54. The transmission signal selection switch 50 outputs, via the output terminal 52, the transmission signal A inputted to the input terminal 51, outputs, via the output terminal 53, the transmission signal B inputted to the input terminal 51, and outputs, via the output terminal 54, the transmission signal C inputted to the input terminal 51. The matching circuit 40 performs output impedance matching for the power amplifier 30.

The duplexer 60 includes a common terminal 61, an input terminal 62, an output terminal 63, a transmission filter 64, and a reception filter 65. The transmission filter 64 has frequency characteristics that the frequency band of the transmission signal A is defined as a pass band and the frequency band of the reception signal A is defined as a stop band. The reception filter 65 has frequency characteristics that the frequency band of the reception signal A is defined as a pass band and the frequency band of the transmission signal A is defined as a stop band. The duplexer 60 provides isolation between the transmission signal A and the reception signal A. The transmission signal A is inputted via the output terminal 52 of the transmission signal selection switch 50 to the input terminal 62 of the duplexer 60, passes through the transmission filter 64, and is outputted via the common terminal 61 to the antenna switch 100.

The duplexer 70 includes a common terminal 71, an input terminal 72, an output terminal 73, a transmission filter 74, and a reception filter 75. The transmission filter 74 has frequency characteristics that the frequency band of the transmission signal B is defined as a pass band and the frequency band of the reception signal B is defined as a stop band. The reception filter 75 has frequency characteristics that the frequency band of the reception signal B is defined as a pass band and the frequency band of the transmission signal B is defined as a stop band. The duplexer 70 provides isolation between the transmission signal B and the reception signal B. The transmission signal B is inputted via the output terminal 53 of the transmission signal selection switch 50 to the input terminal 72 of the duplexer 70, passes through the transmission filter 74, and is outputted via the common terminal 71 to the antenna switch 100.

The duplexer 80 includes a common terminal 81, an input terminal 82, an output terminal 83, a transmission filter 84, and a reception filter 85. The transmission filter 84 has frequency characteristics that the frequency band of the transmission signal C is defined as a pass band and the frequency band of the reception signal C is defined as a stop band. The reception filter 85 has frequency characteristics that the frequency band of the reception signal C is defined as a pass band and the frequency band of the transmission signal C is defined as a stop band. The duplexer 80 provides isolation between the transmission signal C and the reception signal C. The transmission signal C is inputted via the output terminal 54 of the transmission signal selection switch 50 to the input terminal 82 of the duplexer 80, passes through the transmission filter 84, and is outputted via the common terminal 81 to the antenna switch 100.

The receive-only filter 90 includes an input terminal 91 and an output terminal 92. The receive-only filter 90 has frequency characteristics that the frequency band of the reception signal D is defined as a pass band, and selectively allows the reception signal D to pass through the receive-only filter 90. The receive-only filter 90 is different from a reception filter of a duplexer in that the receive-only filter 90 is not used in combination with a transmission filter.

The antenna switch 100 includes a terminal 101 connected to an antenna 110, a terminal 102 connected to the common terminal 61, a terminal 103 connected to the common terminal 71, a terminal 104 connected to the input terminal 91, and a terminal 105 connected to the common terminal 81. The antenna switch 100 selectively establishes signal paths for the transmission signals A, B, and C between the terminals 101 and 102, between the terminals 101 and 103, and between the terminals 101 and 105, respectively. The antenna switch 100 transmits a transmission signal to a base station. The antenna switch 100 selectively establishes signal paths for the reception signals A, B, C, and D, which is received from the base station, between the terminals 101 and 102, between the terminals 101 and 103, between the terminals 101 and 104, and between the terminals 101 and 105, respectively.

The reception signal A is inputted via the terminal 102 of the antenna switch 100 to the common terminal 61 of the duplexer 60, passes through the reception filter 65, and is outputted via the output terminal 63 to the low-noise amplifier module 170. The reception signal B is inputted via the terminal 103 of the antenna switch 100 to the common terminal 71 of the duplexer 70, passes through the reception filter 75, and is outputted via the output terminal 73 to the low-noise amplifier module 170. The reception signal C is inputted via the terminal 105 of the antenna switch 100 to the common terminal 81 of the duplexer 80, passes through the reception filter 85, and is outputted via the output terminal 83 to the low-noise amplifier module 170. The reception signal D is inputted via the terminal 104 of the antenna switch 100 to the input terminal 91 of the receive-only filter 90, passes through the receive-only filter 90, and is outputted via the output terminal 92 to the low-noise amplifier module 170.

The matching circuit 120 performs impedance matching between the reception filter 65 and the low-noise amplifier module 170. The matching circuit 130 performs impedance matching between the reception filter 75 and the low-noise amplifier module 170. The matching circuit 140 performs impedance matching between the receive-only filter 90 and the low-noise amplifier module 170. The matching circuit 150 performs impedance matching between the reception filter 85 and the low-noise amplifier module 170.

The low-noise amplifier module 170 includes input terminals 171, 172, 173, and 174, an output terminal 175, one or more low-noise amplifiers 180, and a switch element 190. The reception signals A, B, C, and D inputted to the input terminals 171, 172, 173, and 174, respectively, are low-noise amplified by the low noise amplifier 180, and are outputted via the output terminal 175 to an RFIC. The switch element 190 selectively establishes a signal path between each of the reception signals A, B, C, and D and the one or more low-noise amplifiers 180.

The high frequency module 10 is capable of an operation based on carrier aggregation. For example, the high frequency module 10 is capable of receiving the reception signal D through the receive-only filter 90 and transmitting and receiving the transmission signal B and the reception signal B at the same time through the duplexer 70. However, the types of transmission signals transmitted at the same time by uplink carrier aggregation are not particularly limited. Any two or more types of transmission signals may be transmitted at the same time by uplink carrier aggregation. Similarly, the types of reception signals received at the same time by downlink carrier aggregation are not particularly limited, and any two or more types of reception signals may be received at the same time by downlink carrier aggregation.

Figure 2:
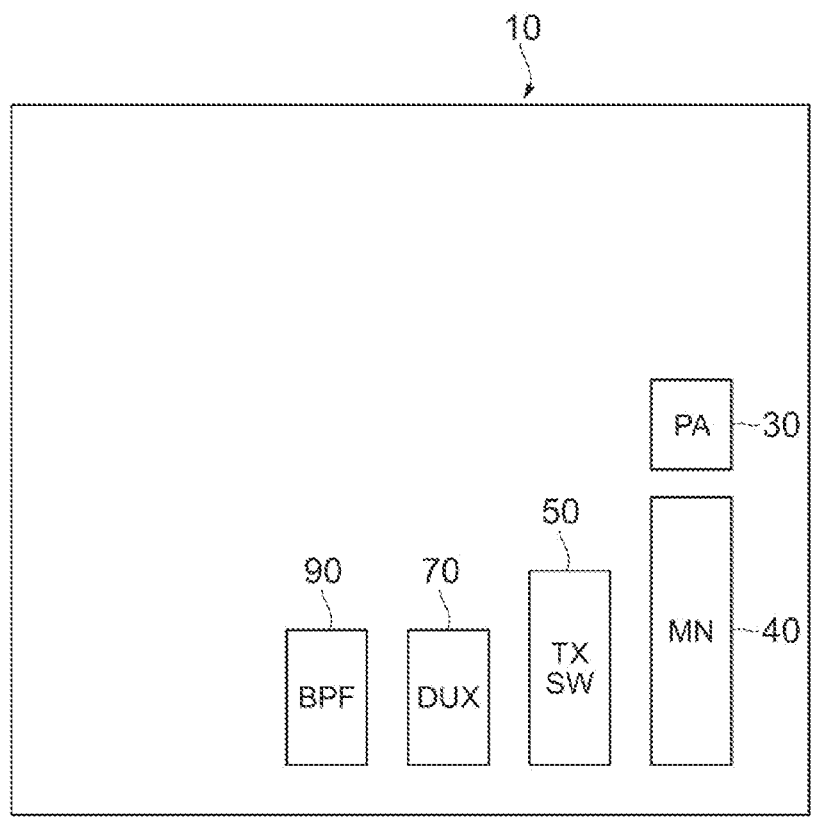
FIG. 2 is an explanatory diagram illustrating an example of the layout relationship of components of the high frequency module according to the first embodiment of the present disclosure.
Figure 3:
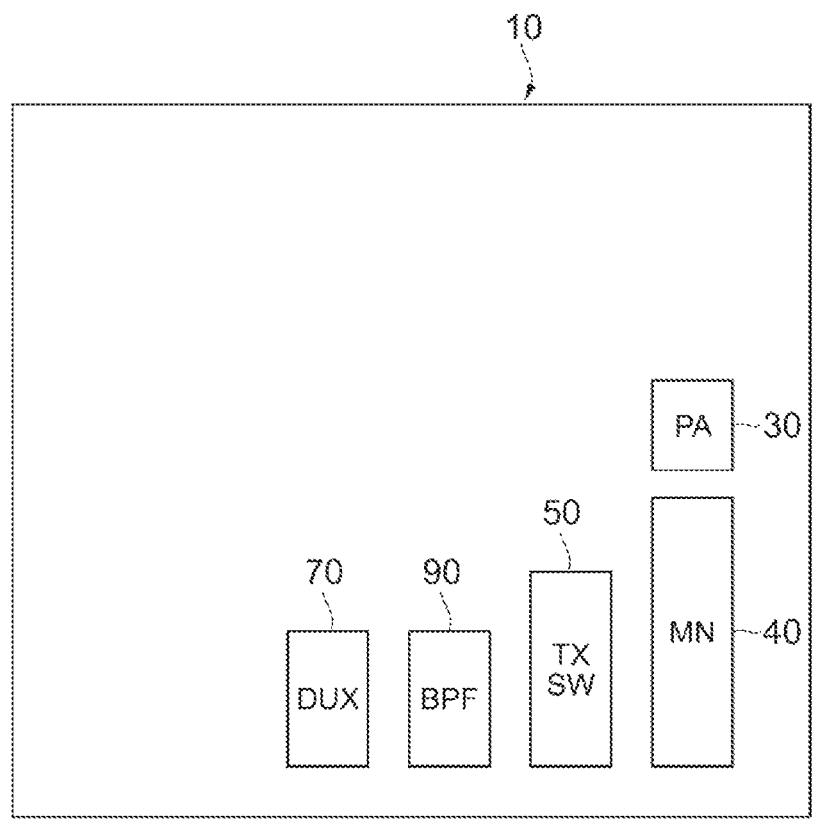
FIG. 3 is an explanatory diagram illustrating an example of the layout relationship of components of the high frequency module according to the first embodiment of the present disclosure.
Figure 4:
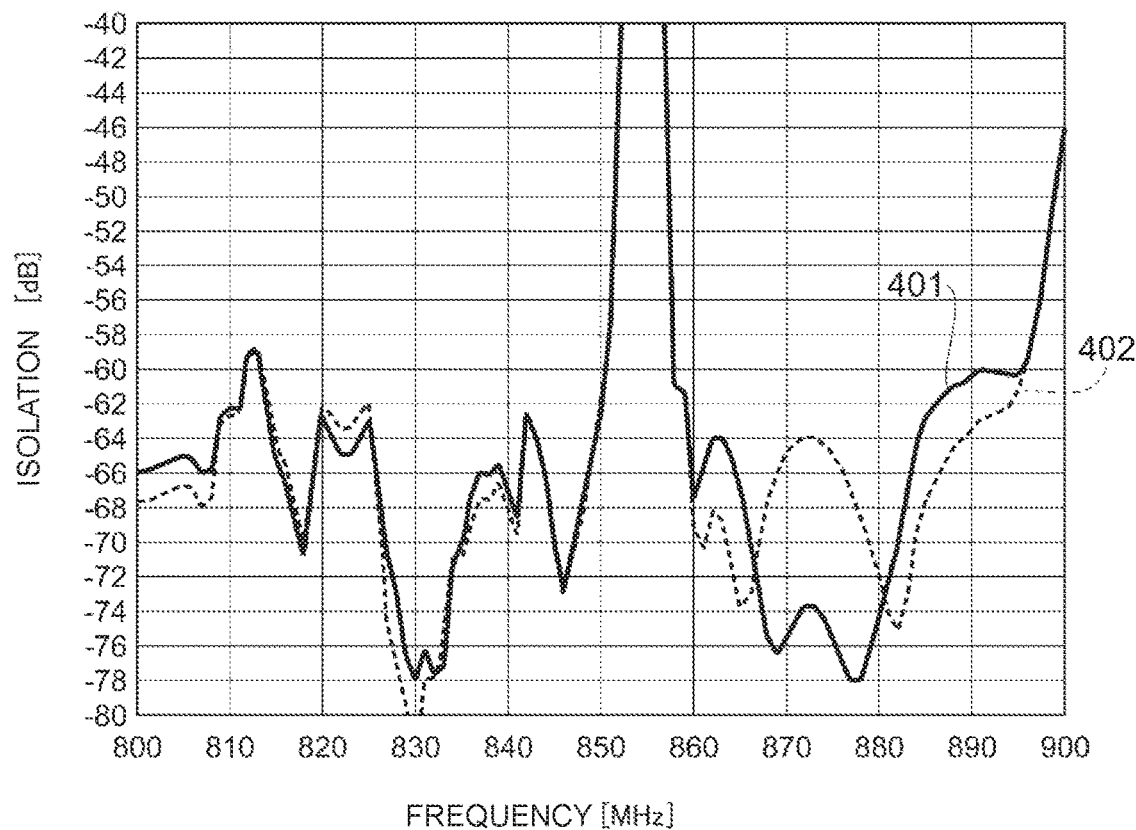
FIG. 4 illustrates simulation results representing the relationship between a frequency and signal attenuation of the high frequency module according to the first embodiment of the present disclosure.

The inventor of the present disclosure sets the layout position where the receive-only filter 90 is mounted in the high frequency module 10 to two different positions, and obtains simulation of how the isolation characteristics between the transmission signal B and the reception signal B at the duplexer 70 change. FIG. 2 illustrates a layout relationship in terms of implementation in the case where the duplexer 70 is arranged between the matching circuit 40 and the receive-only filter 90. FIG. 3 illustrates a layout relationship in terms of implementation in the case where the receive-only filter 90 is arranged between the matching circuit 40 and the duplexer 70. FIG. 4 illustrates a graph of the results of the above simulation. In FIG. 4, reference numeral 401 represents values in the case where the receive-only filter 90 is arranged at the position illustrated in FIG. 2, and reference numeral 402 represents values in the case where the receive-only filter 90 is arranged at the position illustrated in FIG. 3. As is clear from the simulation results, by arranging the receive-only filter 90 between the matching circuit 40 and the duplexer 70, the isolation characteristics between the transmission signal B and the reception signal B at the duplexer 70 may be improved by about 2 dB. This is because it is considered that the duplexer 70 may be placed as further away as possible from the matching circuit 40, which is highly affected by an electromagnetic field of a transmission signal, by arranging the receive-only filter 90, for which there is no need to provide sufficient isolation characteristics between a transmission signal and a reception signal, between the matching circuit 40 and the duplexer 70. Such a layout is useful for the heat source unit 10 in which a space where components are to be mounted is limited due to high-density mounting.

Figure 5:
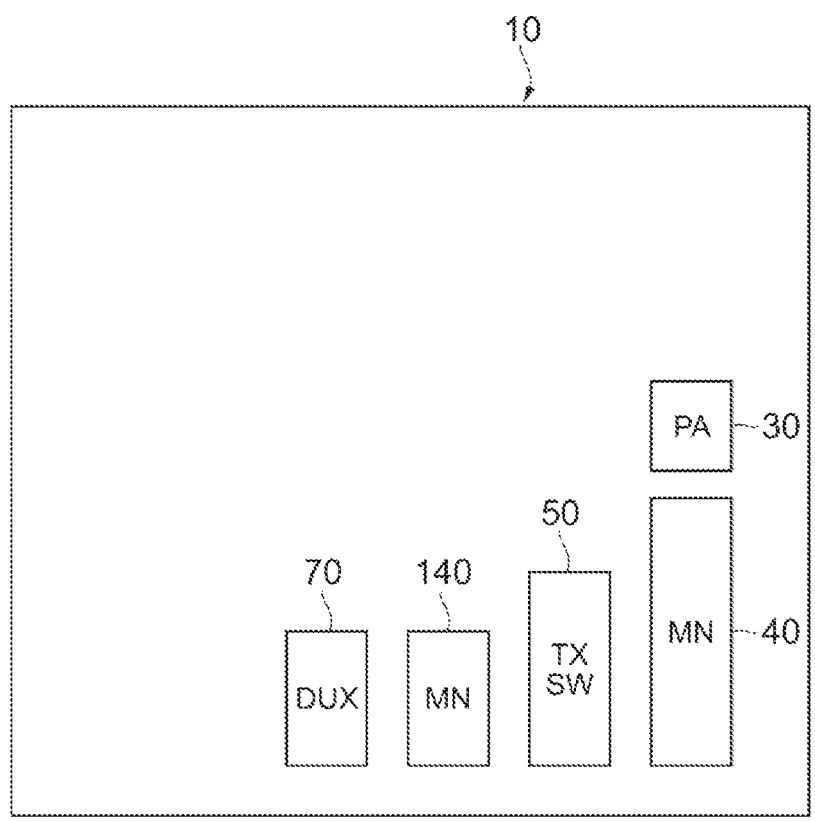
FIG. 5 is an explanatory diagram illustrating an example of the layout relationship of components of the high frequency module according to the first embodiment of the present disclosure.

It has been known that influence of an electromagnetic field of a transmission signal is relatively strong, for example, near the power amplifier 30, as well as near the matching circuit 40. Thus, by arranging the receive-only filter 90 between the power amplifier 30 and the duplexer 70, as illustrated in FIG. 3, the isolation characteristics between the transmission signal B and the reception signal B at the duplexer 70 may be improved. In order to achieve such isolation characteristics, for example, as illustrated in FIG. 5, the matching circuit 140 may be arranged between the duplexer 70 and the power amplifier 30 or between the duplexer 70 and the matching circuit 40.

A switch element for selectively establishing a signal path through which the reception signal D flows may be provided between the receive-only filter 90 and the input terminal 173 of the low-noise amplifier module 170. By arranging the switch element between the power amplifier 30 and the duplexer 70 and between the matching circuit 40 and the duplexer 70, effects similar to those of the above-described isolation characteristics may be achieved.

It should be noted that FIG. 1 merely illustrates the connection relationship of the individual components forming the high frequency module 10 in a schematic manner and does not illustrate a layout relationship in terms of implementation. Furthermore, the illustration of the components that are illustrated in FIG. 1 (except for the antenna 110) but that are not illustrated in FIG. 2, 3, or 5 is omitted. Furthermore, in the above explanation, a layout for enhancing the isolation characteristics between the transmission signal B and the reception signal B at the duplexer 70 is illustrated as an example. Also for the duplexers 60 and 80, similar effects may be achieved by adopting a layout similar to the above-described layout.

Hereinafter, in the case where there is a need to distinguish between the "reception signal B" and the "reception signal D", the "reception signal B" may be referred to as a "first reception signal" and the "reception signal D" may be referred to as a "second reception signal". Furthermore, in the case where there is a need to distinguish between the "matching circuit 140" and the "matching circuit 40", the "matching circuit 140" may be referred to as a "first matching circuit" and the "matching circuit 40" may be referred to as a "second matching circuit".

Figure 6:
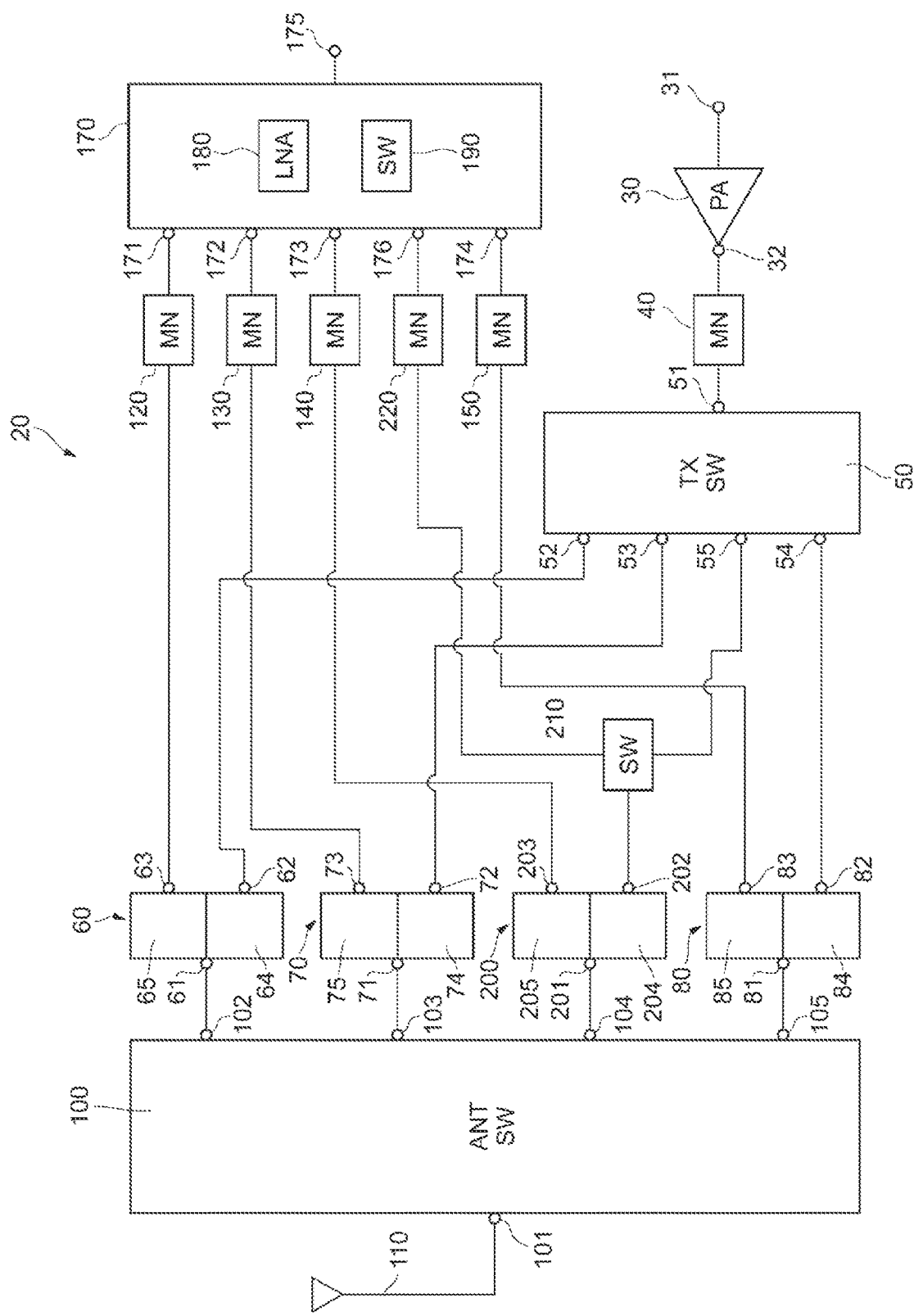
FIG. 6 is an explanatory diagram illustrating a circuit configuration of a high frequency module according to a second embodiment of the present disclosure.

FIG. 6 is an explanatory diagram illustrating a circuit configuration of a high frequency module 20 according to a second embodiment of the present disclosure. The high frequency module 20 according to the second embodiment is different from the high frequency module 10 according to the first embodiment in which the high frequency module 20 includes a duplexer 200 and a switch element 210 in place of the receive-only filter 90. Explanation for redundant parts in the first and second embodiments will be omitted, and differences between the first and second embodiments will be mainly explained.

The high frequency module 20 is configured, for example, to transmit four types of transmission signals of different frequency bands and receive five types of reception signals of different frequency bands. For distinction among the four types of transmission signals, they will be referred to as a transmission signal A, a transmission signal B, a transmission signal C, and a transmission signal E. In the case where there is no need to distinguish among the four types of transmission signals, they will be simply referred to as transmission signals. Similarly, for distinction among the five types of reception signals, they will be referred to as a reception signal A, a reception signal B, a reception signal C, a reception signal D, and a reception signal E. In the case where there is no need to distinguish among the five types of reception signals, they will be simply referred to as reception signals. The number of types of transmission signals is not limited to four. The number of types of transmission signals may be one, two, three, five or more. The number of types of reception signals is not limited to five. The number of types of reception signals may be two, three, four, six, or more.

The duplexer 200 includes a common terminal 201, an input terminal 202, an output terminal 203, a transmission filter 204, and a reception filter 205. The transmission filter 204 has frequency characteristics that the frequency band of the transmission signal E is defined as a pass band and the frequency band of the reception signal E is defined as a stop band. The reception filter 205 has frequency characteristics that the frequency band of the reception signal E is defined as a pass band and the frequency band of the transmission signal E is defined as a stop band. The duplexer 200 provides isolation between the transmission signal E and the reception signal E. The transmission signal E is inputted via an output terminal 55 of the transmission signal selection switch 50 to the input terminal 202 of the duplexer 200, passes through the transmission filter 204, and is outputted via the common terminal 201 to the antenna switch 100.

The transmission filter 204 also operates as a reception filter through which the reception signal D having the same frequency band as the frequency band of the transmission signal E is allowed to pass. For example, the frequency band of an uplink band of band 28 and the frequency band of band 29 overlap. Therefore, the transmission filter 204 functions as a reception filter for band 29 as well as functioning as a transmission filter for band 28.

When the transmission filter 204 functions as a transmission filter for the transmission signal E, the switch element 210 selectively establishes a signal path for the transmission signal E such that the transmission signal E flows from the transmission signal selection switch 50 to the transmission filter 204. In contrast, in the case where the transmission filter 204 functions as a reception filter for the reception signal D, the switch element 210 selectively establishes a signal path for the reception signal D such that the reception signal D flows from the transmission filter 204 to an input terminal 176 of the low-noise amplifier module 170. A matching circuit 220 performs impedance matching between the transmission filter 204 functioning as a reception filter and the low-noise amplifier module 170.

Figure 7:
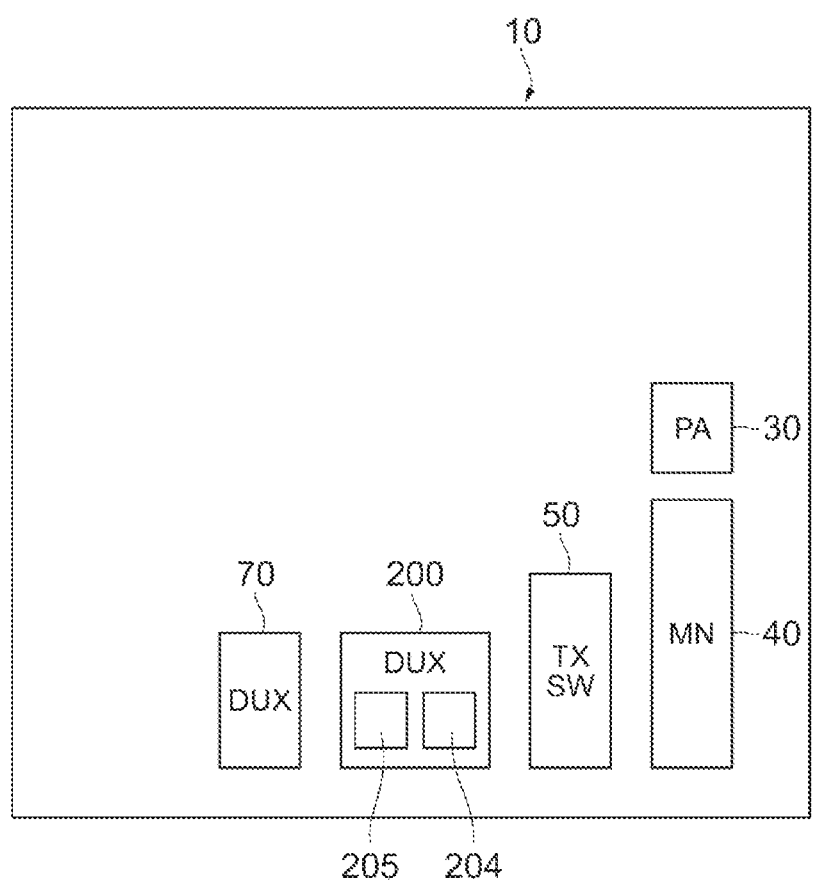
FIG. 7 is an explanatory diagram illustrating an example of the layout relationship of components of the high frequency module according to the second embodiment of the present disclosure.

When the transmission filter 204 functions as a reception filter for the reception signal D, there is no need to ensure sufficient isolation characteristics. Therefore, as illustrated in FIG. 7, it is desirable that the distance between the transmission filter 204 and the power amplifier 30 is shorter than the distance between the reception filter 205 and the power amplifier 30. Alternatively, the distance between the transmission filter 204 and the matching circuit 40 may be shorter than the distance between the reception filter 205 and the matching circuit 40. Furthermore, the duplexer 200 may be arranged closer to the power amplifier 30 or the matching circuit 40 than the duplexer 70 is.

It should be noted that FIG. 6 merely illustrates the connection relationship of the individual components forming the high frequency module 20 in a schematic manner and does not illustrate a layout relationship in terms of implementation. Furthermore, the illustration of the components that are illustrated in FIG. 6 (except for the antenna 110) but that are not illustrated in FIG. 7 is omitted.

Hereinafter, in the case where there is a need to distinguish between the "reception signal E" and the "reception signal D", the "reception signal E" may be referred to as a "first reception signal" and the "reception signal D" may be referred to as a "second reception signal".

It is noted that the foregoing embodiments are provided to facilitate understanding of the present disclosure and are not intended to limit the scope of the present invention. Changes and improvements may be made to the present disclosure without departing from the scope of the present invention, and the present disclosure also includes equivalents thereof. That is, design changes may be made to the embodiments in an appropriate manner by those skilled in the art, and such embodiments are also within the scope of the present disclosure as long as they have features of the present disclosure. The individual circuit elements included in the embodiments and the arrangements thereof are not limited to those described above as examples, and they may be changed in an appropriate manner. For example, a state in which a circuit element A is connected to a circuit element B represents the case where a signal path may be selectively established via a circuit element C (for example, a switch element) between the circuit element A and the circuit element B as well as the case where the circuit element A is directly connected to the circuit element B. In addition, the circuit elements included in the embodiments can be combined with each other as long as it is technically possible, and such combination is also within the scope of the present disclosure as long as the combination has features of the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A high frequency module comprising:
a duplexer comprising a transmission filter and a reception filter, a frequency band of a transmission signal being within a pass band of the transmission filter and a frequency band of a first reception signal being within a pass band of the reception filter;
a receive-only filter, a frequency band of a second reception signal being different from the frequency band of the first reception signal and being within a pass band of the receive-only filter; and
a power amplifier configured to amplify the transmission signal,
wherein the receive-only filter is physically arranged within the high frequency module between the power amplifier and the duplexer and at a first distance from the power amplifier, and the duplexer is physically arranged at a second distance from the power amplifier, the second distance exceeding the first distance.

2. A high frequency module comprising:
a duplexer comprising a transmission filter and a reception filter, a frequency band of a transmission signal being within a pass band of the transmission filter and a frequency band of a first reception signal being within a pass band of the reception filter;
a receive-only filter, a frequency band of a second reception signal being different from the frequency band of the first reception signal and being within a pass band of the receive-only filter;

a power amplifier configured to amplify the transmission signal; and a matching circuit configured to perform output impedance matching for the power amplifier, wherein the receive-only filter is physically arranged within the high frequency module between the matching circuit and the duplexer such that the duplexer is located further away from the matching circuit than the receive-only filter from the matching circuit.

3. A high frequency module comprising:

a duplexer comprising a transmission filter and a reception filter, a frequency band of a transmission signal being within a pass band of the transmission filter and a frequency band of a first reception signal being within a pass band of the reception filter;

a receive-only filter, a frequency band of a second reception signal being different from the frequency band of the first reception signal and being within a pass band of the receive-only filter;

a power amplifier configured to amplify the transmission signal;

a low-noise amplifier configured to low-noise-amplify the first reception signal and the second reception signal; and a matching circuit configured to perform impedance matching between the receive-only filter and the low-noise amplifier, wherein the matching circuit is physically arranged within the high frequency module between the power amplifier and the duplexer such that the duplexer is located further away from the power amplifier than the matching circuit from the power amplifier.

4. A high frequency module comprising:

a duplexer comprising a transmission filter and a reception filter, a frequency band of a transmission signal being within a pass band of the transmission filter and a frequency band of a first reception signal being within a pass band of the reception filter;

a receive-only filter, a frequency band of a second reception signal being different from the frequency band of the first reception signal and being within a pass band of the receive-only filter;

a power amplifier configured to amplify the transmission signal;

a low-noise amplifier configured to low-noise-amplify the first reception signal and the second reception signal;

a first matching circuit configured to perform impedance matching between the receive-only filter and the low-noise amplifier; and a second matching circuit configured to perform output impedance matching for the power amplifier, wherein the first matching circuit is physically arranged within the high frequency module between the second matching circuit and the duplexer such that the duplexer is located further away from the second matching circuit than the first matching circuit from the second matching circuit.

* * * * *